Figure 4:
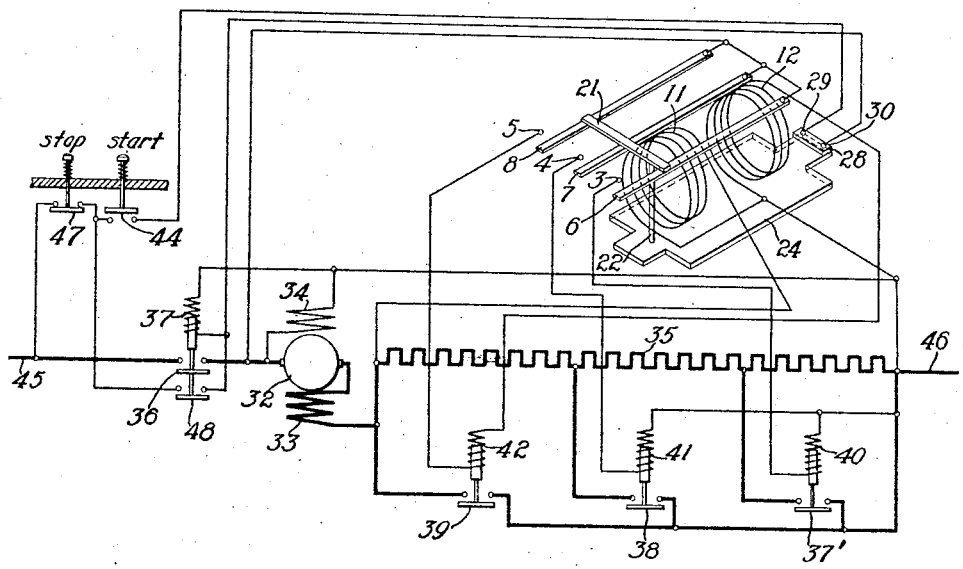

Nov. 11, 1924.
R. E. DE CAMP
1,515,191
MOTOR CONTROL SYSTEM
Filed Nov. 3, 1919
2 Sheets-Sheet 1
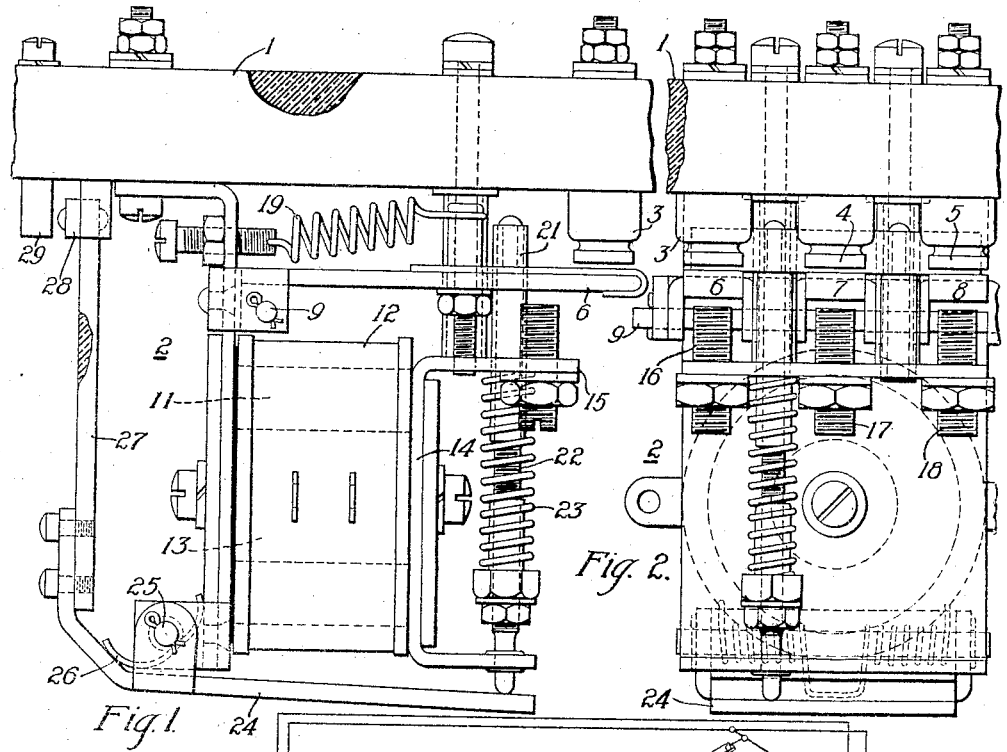
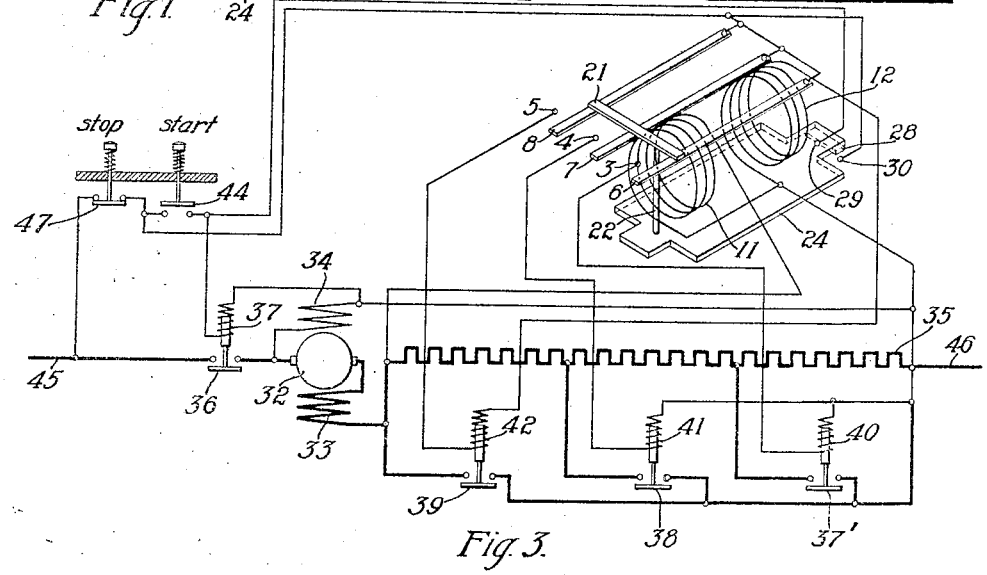
WITNESSES:
H. T. Shelhamer
J. R. Langley
INVENTOR
Ray E. DeCamp
BY
Wesley G. Carr
ATTORNEY Nov. 11, 1924.

R. E. DE CAMP

MOTOR CONTROL SYSTEM

Filed Nov. 3, 1919

1,515,191

2 Sheets-Sheet 2

WITNESSES:

INVENTOR
Ray E. DeCamp
BY
ATTORNEY

Patented Nov. 11, 1924.

1,515,191

UNITED STATES PATENT OFFICE.

RAY E. DE CAMP, OF WILKINSBURG, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed November 3, 1919. Serial No. 335,400.

*To all whom it may concern:*

Be it known that I, RAY E. DE CAMP, a citizen of the United States, and a resident of Wilkinsburg, in the county of Allegheny and State of Pennsylvania, have invented a new and useful Improvement in Motor-Control Systems, of which the following is a specification.

My invention relates to motor-control systems particularly to means for controlling the circuits of electric motors subsequent to their normal operation.

My invention has for its object to provide a simple and efficient means for preventing or controlling the restarting of electric motors, the armatures of which are rotating above a predetermined speed.

In the operation of electric motors that are controlled by devices for automatically accelerating them, it may occur that voltage conditions are such that the usual starting resistor is not removed from circuit upon the restarting of a motor. It may occur, also, in the case of devices having coils that are energized in accordance with the values of the currents traversing the motor circuits, that a coil is not sufficiently energized to effect the operation of the accelerating device by reason of the comparatively high speed of the motor upon the completion of its operating circuit. Since automatic accelerating devices are usually constructed to operate in accordance with the values of the currents traversing the motor circuits, it is obvious that, under the conditions described above, they will not operate to remove the starting resistors from the motor circuits, and the motors may continue to operate under such conditions.

My invention comprises electrical systems that are adapted for use in connection with current-limit relays, such as that shown and described in my copending application Serial No. 241,259, filed June 21, 1918. The usual line switch, which controls the main circuit of an electric motor, is controlled by push-button switches or equivalent devices. The current-limit relay is provided with a bridging member for controlling the effect of the operation of the push-button switch for starting the motor.

In one form of my invention, the bridging member carried by the armature member of the relay controls a shunt circuit for the push-button switch for controlling the line switch. This shunt circuit is open when the armature member of the relay is in its inoperative position and is closed when the armature member is actuated to its operative position. When the armature is released and permitted to return to its normal position, the line switch may be closed by actuating the push-button switch, but it opens again upon the release of the push-button switch unless the relay armature has been actuated to its operative position.

In a modification of the arrangement described above, the circuit controlled by the push-button switch is partially completed by the bridging contact member only when the armature member is in its normal or inoperative position. An interlock connected to the line switch controls a shunt circuit for the push-button switch. In the latter arrangement, the push-button switch for starting the motor is ineffective when the counter-electromotive force of the motor is above a predetermined value at which a holding coil is energized to such degree as to retain the armature member in its operative position.

Figure 1 is a side view, partially in section and partially in elevation, of a current-limit relay; Fig. 2 is an end view, similar to Fig. 1, of the relay; Fig. 3 is a diagrammatic view of circuits and apparatus embodying my invention, as employed in connection with the relay; Fig. 4 is a view, similar to Fig. 3, of a modification.

Referring to Figs. 1 and 2, a base member 1, which may be of slate or other suitable insulating material, supports a relay mechanism 2. Stationary contact members 3, 4 and 5, which are secured directly to the base member 1, coact with corresponding movable contact members 6, 7 and 8, which are pivotally supported by a pin 9. The movable contact members are controlled by an electromagnet comprising an operating coil 11 and a holding coil 12.

A core member 13 is rigidly connected to a plate member 14 of magnetizable material, the end portions of which are bent outwardly at right angles thereto. The upper end portion 15 of the member 14 is provided with a series of screw-threaded studs 16, 17 and 18 which serve as pole pieces for the corresponding movable contact members 6, 7 and 8.

The movable contact members 6, 7 and 8 are biased to their respective closed positions by springs 19. When the magnet is de-energized below a predetermined degree, the movable contact members are retained in their open positions by means of a bar 21, a rod 22, that extends at right angles to the bar 21 and is slidably mounted in the end portions of the plate member 14, and a spring 23 which normally retains the rod 22 and bar 21 in their respective illustrated positions.

The bar 21 and the rod 22 are controlled, also, by an armature member 24 which has a pivotal support at 25 and engages the lower end of the rod 22. A spring 26 yieldingly maintains the armature 24 in engagement with the rod 22. The spring 23 is stronger than the spring 26 and is not compressed by the force of the latter. An arm 27, of insulating material, which is secured to the armature member 24, carries a bridging contact member 28 which coacts with stationary contact members 29 and 30.

The operation of the relay may be described briefly as follows: When the circuit of the motor, in connection with which the relay is employed, is closed by any suitable means, the coil 11 is energized in accordance with the current traversing the motor circuit. This result may be produced by connecting the terminals of the coils across any suitable portion of the motor circuit such, for example, as the starting resistor. A rush of current follows the closing of the motor circuit and the coil 11 is energized to such degree that the armature member 24 is actuated in opposition to the force of the spring 23. The rod 22 and bar 21 are actuated upwardly to permit the closing of contact members 6, 7 and 8 under conditions to be described.

The movable contact members 6, 7 and 8 are retained in their respective open positions so long as the current traversing the coil 11 is above a predetermined value. This predetermined value is materially below that required to cause the actuation of the armature member 24. When the current has fallen to the predetermined value, the movable contact member 6 closes to complete a corresponding circuit. The contact members 7 and 8 do not close because they are arranged to operate at successively lower values of difference in potential between the terminals of the coil 11. This difference of potential is determined by the value of the current traversing the motor circuit and the portion of the starting resistor remaining in circuit. The sequence of operation of the relays at the same predetermined current value is secured by suitable adjustment of the air gaps between the pole pieces 16 and the several contact members.

The relay circuits are so arranged that the holding coil 12 is energized upon the closing of the contact member 8. In one arrangement, the holding coil is connected across the line and its circuit is controlled by the switch for effecting the stopping of the motor.

In another arrangement, the holding coil is energized in accordance with the counter-electromotive force of the motor and maintains the armature 24 in its operative positive position so long as the motor operates above a predetermined speed. The predetermined speed is so arranged that the motor is practically at rest when the armature member is released.

When the coil 12 is sufficiently de-energized, the spring 23 actuates the rod 22 and the armature member 24 to their respective illustrated positions. This movement effects the opening of the contact members 6, 7 and 8 and the opening of the circuit controlled by the bridging contact member 28.

Reference may now be had to Fig. 3, in which a system of control embodying the above-described relay is illustrated. An electric motor having an armature 32 and a series field-magnet winding 33 and a shunt field-magnet winding 34 is in circuit with a starting resistor 35. The motor circuit is controlled by a line switch 36 having an actuating coil 37. The starting resistor 35 is controlled by a series of accelerating switches 37′, 38 and 39 that are respectively provided with actuating coils 40, 41 and 42. The circuits of the latter coils are respectively controlled by the movable contact members 6, 7 and 8 of the relay 2.

To start the motor, a push-button switch 44, that is designated by the legend "Start", is depressed to complete the circuit of the actuating coil 37 of line switch 36. The line switch then closes to complete the motor circuit which extends from line conductor 45, through line switch 36, armature 32, series field-magnet winding 33 and resistor 35, to line conductor 46. A heavy rush of current traverses the motor circuit, thereby causing a considerable difference in potential across the terminals of the resistor 35. The coil 11 of the relay 2 is energized to actuate the armature 24 and thereby cause the withdrawal of the bar 21. The relay contact members 6, 7 and 8 are, however, retained in their open positions until the current falls to the desired predetermined value.

The closing of armature 24 causes bridging contact member 28 to complete a shunt circuit for the push-button switch 44. The latter may then be released and the circuit of the coil 37 be thus maintained through the shunt circuit.

When the motor has accelerated to such degree that its counter-electromotive force causes the current to be reduced to the predetermined value, the movable contact member 6 completes a circuit for the actuating coil 40. This circuit extends from line conductor 45, through "stop" push-button switch 47, contact members 6 and 3 and coil 40, to line conductor 46. The switch 37' closes to complete a shunt circuit for a portion of a resistor 35.

A rush of current follows the closing of the switch 37', and the switches 7 and 8 are retained in their open positions until the current again falls to the predetermined value. The movable contact member 7 then completes a circuit for the actuating coil 41 of switch 38. The latter then closes to shunt a second section of the resistor. The contact member 8 closes when the current has again fallen to the predetermined value and the coil 42 is energized to effect the closing of switch 39.

The closing of contact member 8 completes the circuit of the holding coil 12, which is in series with the actuating coil 42. The coil 11 is de-energized upon the closing of switch 39 to shunt the entire starting resistor 35. The coil 12 maintains the armature 24 in the position to which it was actuated by the coil 11 during the normal operation of the motor. Since the coil 12 is connected across the line, the armature member 24 and the accelerating switches are retained in their respective operative positions so long as the counter-electromotive force of the motor exceeds a predetermined value.

To stop the motor, the push-button switch 47 is depressed to open the circuit of the actuating coil 37 of line switch 36. The motor circuit is then opened and the motor may be brought to rest by any suitable means such, for example, as a mechanical brake. The opening of the push-button switch 47 opens the circuits, also, of the holding coil 12 and of the coils 40, 41 and 42. The armature member 24 is released to effect the opening of contact members 6, 7 and 8 and of bridging contact member 28. The accelerating switches are opened to insert the resistor 35 in circuit in readiness for the succeeding starting operation.

If, after the opening of the line switch and of the accelerating switches and while the motor armature is rotating at a comparatively high speed, the "start" push-button switch is depressed, the line switch closes. There does not occur, however, a rush of current of such value as to effect the actuation of the armature member 24 to release the relay contact members and to close the line bridging contact member 28. The line switch will, accordingly, open upon the release of the push-button switch 44.

By means of the above arrangement, it is impossible, therefore, to maintain the connection of the motor, independently of the position of the push-button switch 44, to a source of energy with the starting resistor 35 in circuit under such conditions of motor speed that the relay armature 24 would not be drawn upwardly to release the movable contact members. In the absence of such arrangement, this condition might arise by reason of the relatively low value of the current which would traverse the motor circuit if the counter-electromotive force of the motor were comparatively high when the circuit is closed.

Reference may now be had to Fig. 4 in which a modification of my invention is illustrated. Similar numerals are employed to designate parts corresponding to those described in connection with the preceding figures. In view of the similarity of the systems of Fig. 3 and Fig. 4, the latter system will be described only in connection with its operation.

The depression of push-button switch 44 completes a circuit for the actuating coil 37 of line switch 36 which extends from line conductor 45 through push-button switches 47 and 44, contact members 29, 28 and 30 and coil 37 to line conductor 46. The line switch 36 is then closed to complete the motor circuit through the starting resistor 35. A switch 48, which is mechanically connected to the line switch 36, completes a holding circuit for the coil 37 and renders the circuit of the latter independent of the push-button switch 44 and of the bridging contact member 28 which is, in the present arrangement, in its closed position when the relay magnet is de-energized.

The contact members 6, 7 and 8 close in order to effect the closing of the accelerating switches 37', 38 and 39 in the manner previously described in connection with the system of Fig. 3. The coil 11 is de-energized upon the shunting of the resistor 35, but the holding coil 12 is, in the present system, connected across the motor armature and is, therefore, energized in accordance with the counter-electromotive force of the motor.

To stop the motor, the push-button switch 47 is depressed to effect the opening of the circuit of actuating coil 37. The line switch 36 then opens and the motor is decelerated in any desired or usual manner. The motor circuit cannot be closed by the operation of the push-button switch 44 until the speed of the motor has fallen to a predetermined rate by reason of the fact that the bridging member 28, is in its open position and the push-button switch 44 is ineffective to close the circuit of the actuating coil 37.

In each of the above-described arrangements, it is impossible for the circuit of the motor to be completed and maintained automatically when its armature is rotating above a predetermined speed. It is impossible, therefore, for the motor to operate with the starting resistor in circuit because of the failure of the releasing mechanism of the relay to operate and thus permit the closing of the accelerating switches.

I claim as my invention:

1. In a motor-control system, the combination with an electric motor, a line switch for controlling the circuit of said motor and an accelerating switch for said motor, of means for controlling the operation of said switches in accordance with the difference in potential across a portion of the motor circuit, said means comprising a relay having one position rendering possible the operation of said line switch and preventing the operation of said accelerating switch and a second position rendering possible the operation of said accelerating switch.

2. In a motor-control system, the combination with an electric motor and a line switch and an accelerating switch therefor, of a relay having a movable contact member for controlling said accelerating switch, a retaining member therefor, a coil connected across a portion of the motor circuit and a contact member carried by said retaining member for controlling said line switch.

3. In a motor-control system, the combination with an electric motor and a line switch and an accelerating switch therefor, of a relay having a movable member for controlling said accelerating switch and a second movable member for controlling the first movable member, a contact member carried by the second movable member for controlling said line switch and a coil connected across a portion of the motor circuit for controlling the second movable member.

4. In a motor-control system, the combination with an electric motor and a line switch and an accelerating switch therefor, of a relay having a movable member for controlling said accelerating switch and a second movable member for controlling the first movable member, a contact member carried by the second movable member for controlling said line switch and a coil energized, when the speed of the motor exceeds a predetermined rate, to maintain the second movable member in such position as to prevent the closing of the line switch.

5. In a motor-control system, the combination with an electric motor and a line switch and an accelerating switch therefor, of a relay having a movable member for controlling said accelerating switch and a second movable member for controlling the first movable member, a contact member carried by the second movable member for controlling said line switch and a coil energized in accordance with the speed of the motor for controlling the position of the second movable member whereby the closing of the line switch is prevented unless the accelerating switch is open and the speed is below a predetermined rate.

6. In a motor-control system, the combination with an electric motor and a line switch therefor, of a plurality of accelerating switches, and means comprising a relay having a plurality of successively operable members and a coil energized in accordance with the difference in potential across a portion of the motor circuit for permitting the closing of said line switch only when the relay members occupy their inoperative positions.

In testimony whereof, I have hereunto subscribed my name this 28th day of Oct., 1919.

RAY E. DE CAMP.